US012366922B2

(12) United States Patent
Huang et al.

(10) Patent No.: US 12,366,922 B2
(45) Date of Patent: Jul. 22, 2025

(54) DRIVE CONTROL CIRCUIT, DRIVING METHOD THEREOF, AND HAPTIC FEEDBACK APPARATUS

(71) Applicants: Beijing BOE Technology Development Co., Ltd., Beijing (CN); BOE TECHNOLOGY GROUP CO., LTD., Beijing (CN)

(72) Inventors: Jijing Huang, Beijing (CN); Jiawen Zhang, Beijing (CN); Zongmin Liu, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/685,600

(22) PCT Filed: Aug. 10, 2022

(86) PCT No.: PCT/CN2022/111356
§ 371 (c)(1),
(2) Date: Feb. 22, 2024

(87) PCT Pub. No.: WO2024/031415
PCT Pub. Date: Feb. 15, 2024

(65) Prior Publication Data
US 2024/0353929 A1  Oct. 24, 2024

(51) Int. Cl.
*G06F 3/01*  (2006.01)
*G06F 3/041*  (2006.01)
*G06F 3/0488*  (2022.01)

(52) U.S. Cl.
CPC ............ *G06F 3/016* (2013.01); *G06F 3/0416* (2013.01); *G06F 3/0488* (2013.01)

(58) Field of Classification Search
CPC ...... G06F 3/016; G06F 3/0416; G06F 3/0488; G06F 3/041
See application file for complete search history.

(56) References Cited

U.S. PATENT DOCUMENTS 10,318,083 B1    6/2019  McKown et al.
2018/0074101 A1*  3/2018  Wu ................... G01R 27/2605
(Continued)

FOREIGN PATENT DOCUMENTS

CN    103616635 A    3/2014
CN    107305432 A    10/2017
(Continued)

OTHER PUBLICATIONS

European Patent Office, Extended European Search Report, Feb. 4, 2025, for corresponding EP application No. 22954391.3.

*Primary Examiner* — Brent D Castiaux
(74) *Attorney, Agent, or Firm* — HOUTTEMAN LAW LLC

(57) ABSTRACT

A drive control circuit, including: a feedback detection circuit configured to, when a target object presses on a haptic feedback panel, process an initial voltage signal of each of at least one haptic detection piezoelectric device, and output a detection signal corresponding to each of the at least one haptic detection piezoelectric device; a data processing circuit configured to receive the detection signal corresponding to each of the at least one haptic detection piezoelectric device, and output a drive enable signal according to the detection signal corresponding to each of the at least one haptic detection piezoelectric device and a set threshold; and a feedback drive circuit configured to receive the drive enable signal, and output a drive control signal to the at least one haptic drive piezoelectric device according to the drive enable signal.

18 Claims, 13 Drawing Sheets

(56) References Cited

U.S. PATENT DOCUMENTS

| | | | |
|---|---|---|---|
| 2020/0097086 A1 | 3/2020 | Bushnell et al. | |
| 2021/0240281 A1* | 8/2021 | Knoppert | H01H 13/7065 |
| 2022/0221938 A1 | 7/2022 | Chen et al. | |

FOREIGN PATENT DOCUMENTS

| | | |
|---|---|---|
| CN | 107422867 A | 12/2017 |
| CN | 207115379 U | 3/2018 |
| CN | 110413099 A | 11/2019 |
| CN | 112422127 A | 2/2021 |
| WO | WO 2021035617 A1 * | 3/2021 |

* cited by examiner

DRIVE CONTROL CIRCUIT, DRIVING METHOD THEREOF, AND HAPTIC FEEDBACK APPARATUS

TECHNICAL FIELD

The present disclosure relates to the technical field of haptic interaction, and particularly relates to a drive control circuit, a driving method thereof, and a haptic feedback apparatus.

BACKGROUND

Haptics is a focus of modern technological development, and specifically speaking, haptics enables interaction between a terminal and a human body through the tactile sense. Haptics may be further divided into two categories, vibration feedback and haptic rendering.

Surface haptic rendering can enable sensing of object characteristics by touching a screen with a naked finger, thereby implementing efficient and natural interaction at a multimedia terminal, which has a very promising research value, and thus has gained wide attention among researchers at home and abroad. In the physical sense, the surface tactile sense refers to interaction between roughness of an object surface and a skin (fingertip) surface, in which different frictions are formed due to different surface structures. Therefore, simulation of different tactile/haptic sensations can be achieved by controlling the surface friction.

SUMMARY

An embodiment of the present disclosure provides a drive control circuit, including:

a feedback detection circuit coupled to at least one haptic detection piezoelectric device in a haptic feedback panel, the feedback detection circuit being configured to, when a target object presses on the haptic feedback panel, process an initial voltage signal of each of the at least one haptic detection piezoelectric device, and output a detection signal corresponding to each of the at least one haptic detection piezoelectric device;

a data processing circuit coupled to the feedback detection circuit, the data processing circuit being configured to receive the detection signal corresponding to each of the at least one haptic detection piezoelectric device, and output a drive enable signal according to the detection signal corresponding to each of the at least one haptic detection piezoelectric device and a set threshold; and a feedback drive circuit coupled to at least one haptic drive piezoelectric device in the haptic feedback panel and the data processing circuit, the feedback drive circuit being configured to receive the drive enable signal, and output a drive control signal to the at least one haptic drive piezoelectric device according to the drive control signal.

In some possible implementations, the feedback detection circuit includes at least one first feedback detection sub-circuit and at least one second feedback detection sub-circuit; the at least one haptic detection piezoelectric device, the at least one first feedback detection sub-circuit, and the at least one second feedback detection sub-circuit are in one-to-one correspondence;

the first feedback detection sub-circuit is coupled to a corresponding one of the at least one haptic detection piezoelectric device, and configured to, when the target object presses on the haptic feedback panel, amplify an initial voltage signal of the coupled haptic detection piezoelectric device, generate a target amplified voltage signal, and output the generated target amplified voltage signal;

the second feedback detection sub-circuit is coupled to a corresponding one of the at least one first feedback detection sub-circuit, and configured to receive the target amplified voltage signal, perform analog-to-digital conversion on the target amplified voltage signal to generate the detection signal, and output the generated detection signal.

In some possible implementations, the first feedback detection sub-circuit includes a first amplifier and a second amplifier;

a first input of the first amplifier is coupled to the corresponding haptic detection piezoelectric device, a second input of the first amplifier is coupled to a ground terminal, an output of the first amplifier is coupled to a first input of the second amplifier, a second input of the second amplifier is coupled to the ground terminal, and an output of the second amplifier is coupled to the data processing circuit.

In some possible implementations, the first input of the first amplifier is an inverting input, the second input of the first amplifier is a non-inverting input, the first input of the second amplifier is an inverting input, and the second input of the second amplifier is a non-inverting input.

In some possible implementations, the first input of the first amplifier is a non-inverting input, the second input of the first amplifier is an inverting input, the first input of the second amplifier is a non-inverting input, and the second input of the second amplifier is an inverting input.

In some possible implementations, the first input of the first amplifier is a non-inverting input, the second input of the first amplifier is an inverting input, the first input of the second amplifier is an inverting input, and the second input of the second amplifier is a non-inverting input.

In some possible implementations, the first input of the first amplifier is an inverting input, the second input of the first amplifier is a non-inverting input, the first input of the second amplifier is a non-inverting input, and the second input of the second amplifier is an inverting input.

In some possible implementations, the first feedback detection sub-circuit further includes a first resistor and a second resistor;

a first end of the first resistor is coupled to the inverting input of the first amplifier, and a second end of the first resistor is coupled to the output of the first amplifier; and a first end of the second resistor is coupled to the inverting input of the second amplifier, and a second end of the second resistor is coupled to the output of the second amplifier.

In some possible implementations, the first feedback detection sub-circuit further includes at least one of a third resistor, a fourth resistor, a fifth resistor, or a sixth resistor;

a first end of the third resistor is coupled to the corresponding haptic detection piezoelectric device, and a second end of the third resistor is coupled to the first input of the first amplifier;

a first end of the fourth resistor is coupled to the ground terminal, and a second end of the fourth resistor is coupled to the second input of the first amplifier;

a first end of the fifth resistor is coupled to the output of the first amplifier, and a second end of the fifth resistor is coupled to the first input of the second amplifier; and a first end of the sixth resistor is coupled to the ground terminal, and a second end of the sixth resistor is coupled to the second input of the second amplifier.

In some possible implementations, the second feedback detection sub-circuit includes an analog-to-digital conversion circuit;

an input of the analog-to-digital conversion circuit is coupled to the first feedback detection sub-circuit, and an output of the analog-to-digital conversion circuit is coupled to the data processing circuit.

In some possible implementations, the feedback drive circuit includes at least one reference voltage generation circuit, at least one drive generation circuit, and at least one signal output circuit; the at least one reference voltage generation circuit, the at least one drive generation circuit, the at least one signal output circuit, and the at least one haptic drive piezoelectric device are in one-to-one correspondence;

the reference voltage generation circuit is configured to generate a reference voltage;

the drive generation circuit is coupled to the data processing circuit, and configured to receive the drive enable signal and the reference voltage, generate an initial control signal according to the drive enable signal and the reference voltage, and output the initial control signal;

the signal output circuit is coupled to the drive generation circuit, and configured to receive the initial control signal, perform boosting on the initial control signal to generate the drive control signal, and output the drive control signal to a correspondingly coupled haptic drive piezoelectric device.

In some possible implementations, the drive generation circuit includes a digital-to-analog conversion circuit, a third amplifier and a first capacitor;

a signal input of the digital-to-analog conversion circuit is coupled to the data processing circuit, a reference voltage input of the digital-to-analog conversion circuit is coupled to the reference voltage generation circuit, an output of the digital-to-analog conversion circuit is coupled to a non-inverting input of the third amplifier, a comparison voltage terminal of the digital-to-analog conversion circuit is coupled to an inverting input of the third amplifier, and a reference signal terminal of the digital-to-analog conversion circuit is coupled to an output of the third amplifier;

the output of the third amplifier is coupled to the signal output circuit; and a first end of the first capacitor is coupled to the inverting input of the third amplifier, and a second end of the first capacitor is coupled to the output of the third amplifier.

In some possible implementations, the signal output circuit includes a high voltage operational amplifier; wherein a first input of the high voltage operational amplifier is coupled to the drive generation circuit, a second input of the high voltage operational amplifier is coupled to a ground terminal, and an output of the high voltage operational amplifier is coupled to the corresponding haptic drive piezoelectric device; and wherein the first input of the high voltage operational amplifier is a non-inverting input, and the second input of the high voltage operational amplifier is an inverting input; or, the first input of the high voltage operational amplifier is an inverting input, and the second input of the high voltage operational amplifier is a non-inverting input.

In some possible implementations, the signal output circuit further includes a seventh resistor;

a first end of the seventh resistor is coupled to the inverting input of the high voltage operational amplifier, and a second end of the seventh resistor is coupled to the output of the high voltage operational amplifier.

In some possible implementations, the signal output circuit further includes at least one of an eighth resistor, a ninth resistor, or a tenth resistor;

a first end of the eighth resistor is coupled to the ground terminal, and a second end of the eighth resistor is coupled to the second input of the high voltage operational amplifier;

a first end of the ninth resistor is coupled to the output of the high voltage operational amplifier, and a second end of the ninth resistor is coupled to the corresponding haptic drive piezoelectric device; and a first end of the tenth resistor is coupled to the drive generation circuit, and a second end of the tenth resistor is coupled to the first input of the high voltage operational amplifier.

In some possible implementations, the data processing circuit is further configured to determine a detection comparison value according to the detection signal and a weight corresponding to each of the at least one haptic detection piezoelectric device; and output the drive enable signal when the detection comparison value is not less than the set threshold.

In some possible implementations, the detection comparison value is determined by:

$$FS = a_1 * f_1 + a_2 * f_2 + a_3 * f_3 + \ldots\ldots a_{M-1} * F_{M-1} + a_M * F_M;$$

where FS represents the detection comparison value, $a_m$ represents a weight corresponding to an $m^{th}$ haptic detection piezoelectric device, $f_m$ represents the detection signal corresponding to the $m^{th}$ haptic detection piezoelectric device, $1 \leq m \leq M$, M and m are both integers, and M represents a total number of haptic detection piezoelectric devices in the haptic feedback panel.

In some possible implementations, the data processing circuit is further configured to acquire position coordinates where the target object presses on the haptic feedback panel; determine a press distance between the position coordinates where the target object presses on the haptic feedback panel and each of the at least one haptic detection piezoelectric device; and determine, according to the press distance of each of the at least one haptic detection piezoelectric device, the weight corresponding to each of the at least one haptic detection piezoelectric device.

In some possible implementations, the drive control circuit further includes a touch drive circuit; the touch drive circuit is coupled to a plurality of touch electrodes in the haptic feedback panel, and configured to, when the target object presses on the haptic feedback panel, acquire touch voltage signals on the touch electrodes, and determine position coordinates where the target object presses on the haptic feedback panel according to the acquired touch voltage signals; and the data processing circuit is further configured to acquire the position coordinates where the target object presses on the haptic feedback panel from the touch drive circuit.

In some possible implementations, the drive control circuit further includes a power management circuit and an interface circuit;

the power management circuit is configured to provide a supply voltage for the feedback detection circuit, the data processing circuit, and the feedback drive circuit; and the data processing circuit is coupled to the touch drive circuit through the interface circuit.

An embodiment of the present disclosure further provides a haptic feedback apparatus, including a haptic feedback panel, and the drive control circuit described above.

An embodiment of the present disclosure further provides a method for driving the drive control circuit described above, including:

processing an initial voltage signal of each of the at least one haptic detection piezoelectric device and outputting a detection signal corresponding to each of the at least one haptic detection piezoelectric device, when a target object presses on the haptic feedback panel;

outputting a drive enable signal, according to the detection signal corresponding to each of the at least one haptic detection piezoelectric device and a set threshold; and outputting a drive control signal to at least one haptic drive piezoelectric device, according to the drive control signal.

DETAIL DESCRIPTION OF EMBODIMENTS

Figure 1:
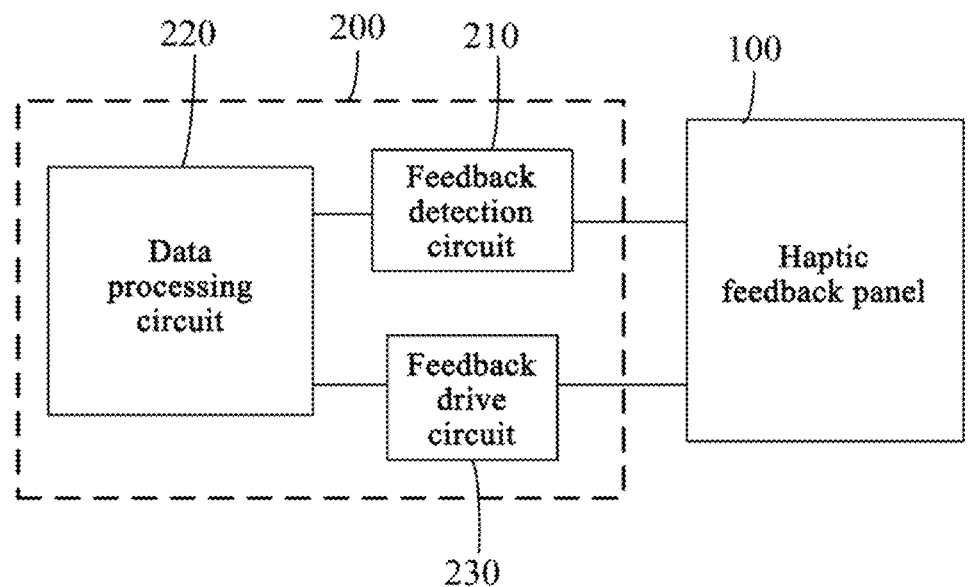
FIG. 1 is a schematic structural view of a haptic feedback apparatus according to an embodiment of the present disclosure.

To make the objects, technical solutions and advantages of the embodiments of the present disclosure more apparent, the technical solutions according to the embodiments of the present disclosure will be clearly and completely described below with reference to the drawings of the embodiments of the present disclosure. Apparently, the described embodiments are some, but not all, of the embodiments of the present disclosure. Further, the embodiments of the present disclosure and features thereof may be combined with each other as long as they are not contradictory. All other embodiments obtained by those skilled in the art based on the embodiments of the present disclosure described herein without paying any creative effort shall be included in the protection scope of the present disclosure.

Unless otherwise defined, technical or scientific terms used in the present disclosure are intended to have general meanings as understood by those skilled in the art. The words "first", "second" and similar terms used in the present disclosure do not denote any order, quantity, or importance, but are used merely for distinguishing different components from each other. The word "comprising" or "including" or the like means that the element or item preceding the word contains elements or items that appear after the word or equivalents thereof, but does not exclude other elements or items. The terms "connected" or "coupled" and the like are not restricted to physical or mechanical connections, but may include electrical connections, whether direct or indirect.

It should be noted that the sizes and shapes of various components in the drawings are not to scale, but are merely intended to schematically illustrate the present disclosure. The same or similar reference signs refer to the same or similar elements or elements with the same or similar functions throughout the drawings.

For a vibration-based haptic rendering device, the working principle is generally that a piezoelectric patch, a linear motor, or a piezoelectric film is attached to a base substrate and subjected to pulsed excitation to implement a touch function such as a virtual key. Where a linear motor is used, the linear motor may occupy a large internal space of an electronic product due to a large volume, resulting in a reduced volume of battery and thus reduced endurance time of the product. Where a piezoelectric patch is used, a voltage amplifier is required, which may occupy the battery space on the one hand, and cause potential electric shock risks due to a high voltage on the other hand. Where a piezoelectric film is used, the film typically has a thickness less than 10 μm, which can significantly reduce the thickness of the device, increase the battery space, and improve the comprehensive endurance time of the product. In addition, the piezoelectric film solution does not need a high voltage, thereby ensuring voltage safety of the product.

An embodiment of the present disclosure provides a haptic feedback apparatus which, as shown in FIG. 1, includes a haptic feedback panel 100, and a drive control circuit 200. The drive control circuit 200 is configured to drive the haptic feedback panel 100 to operate. Illustratively, the haptic feedback apparatus provided in the embodiments of the present disclosure may be applied to the technical fields of medical treatment, automotive electronics, motion tracking systems, and the like, especially to wearable devices, medical monitoring and treatment in vitro or implanted into a human body, or the field of artificial intelligent electronic skin, and the like. Specifically, the haptic feedback apparatus may be applied to a brake pad, a keyboard, a mobile terminal, a game pad, a vehicle, a smart home system, or any other haptic feedback apparatus that may generate vibration and mechanical characteristics.

Figure 2A:
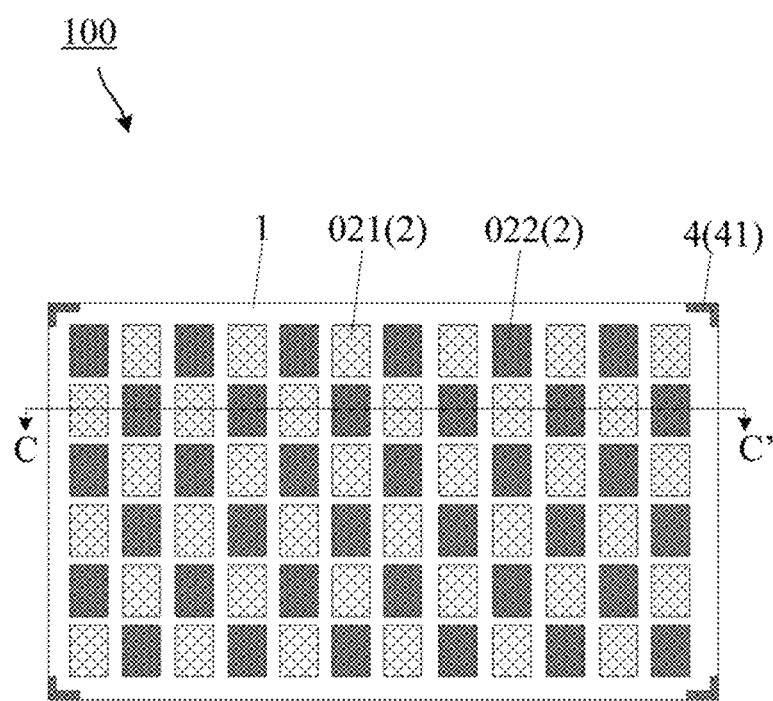
FIG. 2a is a schematic diagram of some structures in a haptic feedback panel according to an embodiment of the present disclosure.
Figure 2B:
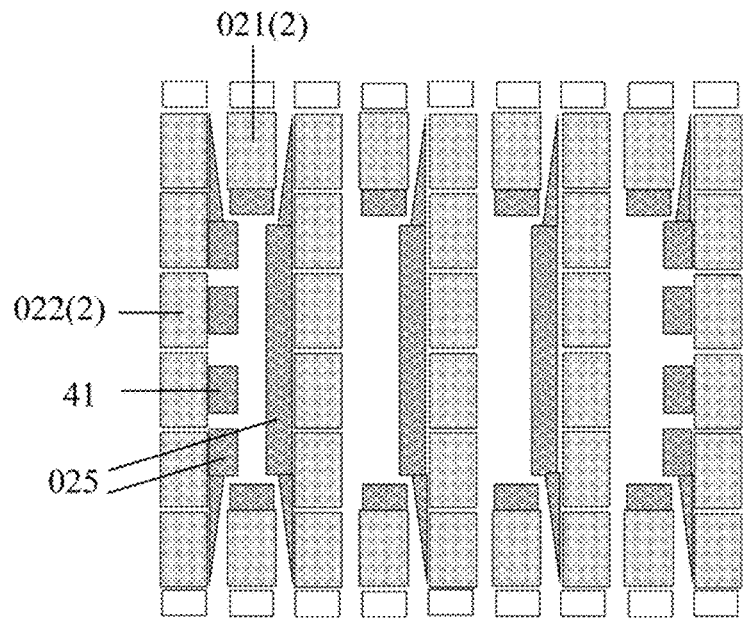
FIG. 2b is a structural diagram of some other structures in a haptic feedback panel according to an embodiment of the present disclosure.
Figure 2C:
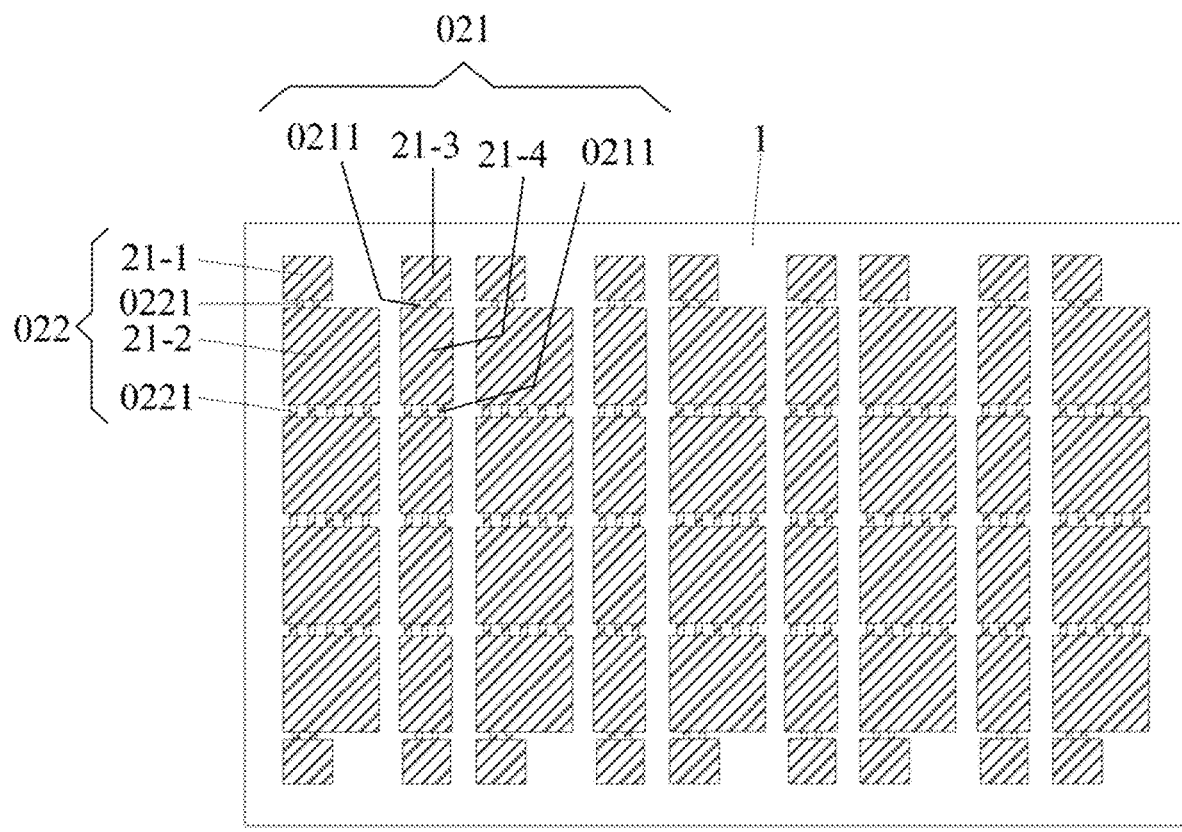
FIG. 2c is a structural diagram of still other structures in a haptic feedback panel according to an embodiment of the present disclosure.
Figure 2D:
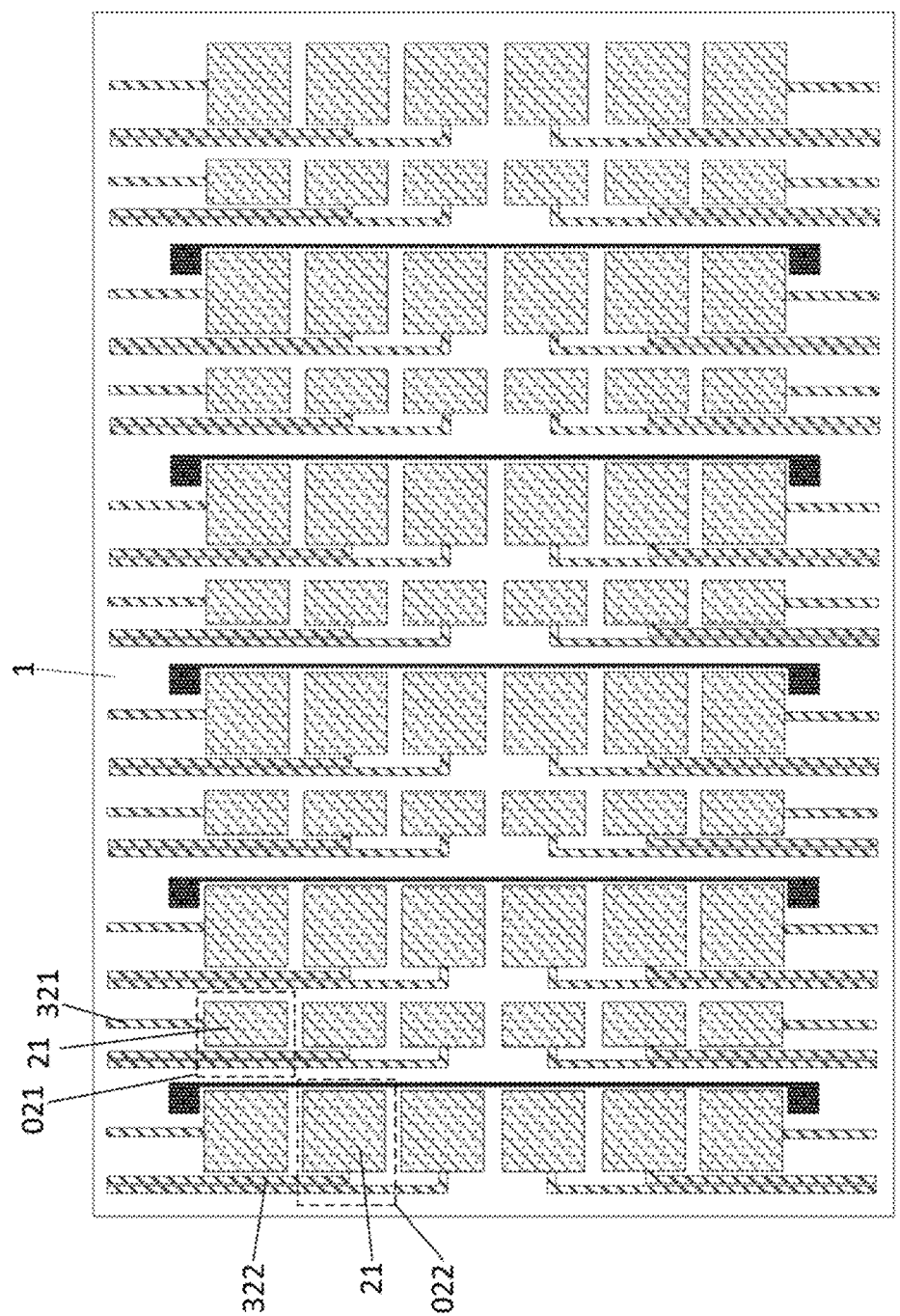
FIG. 2d is a structural diagram of still other structures in a haptic feedback panel according to an embodiment of the present disclosure.
Figure 2E:
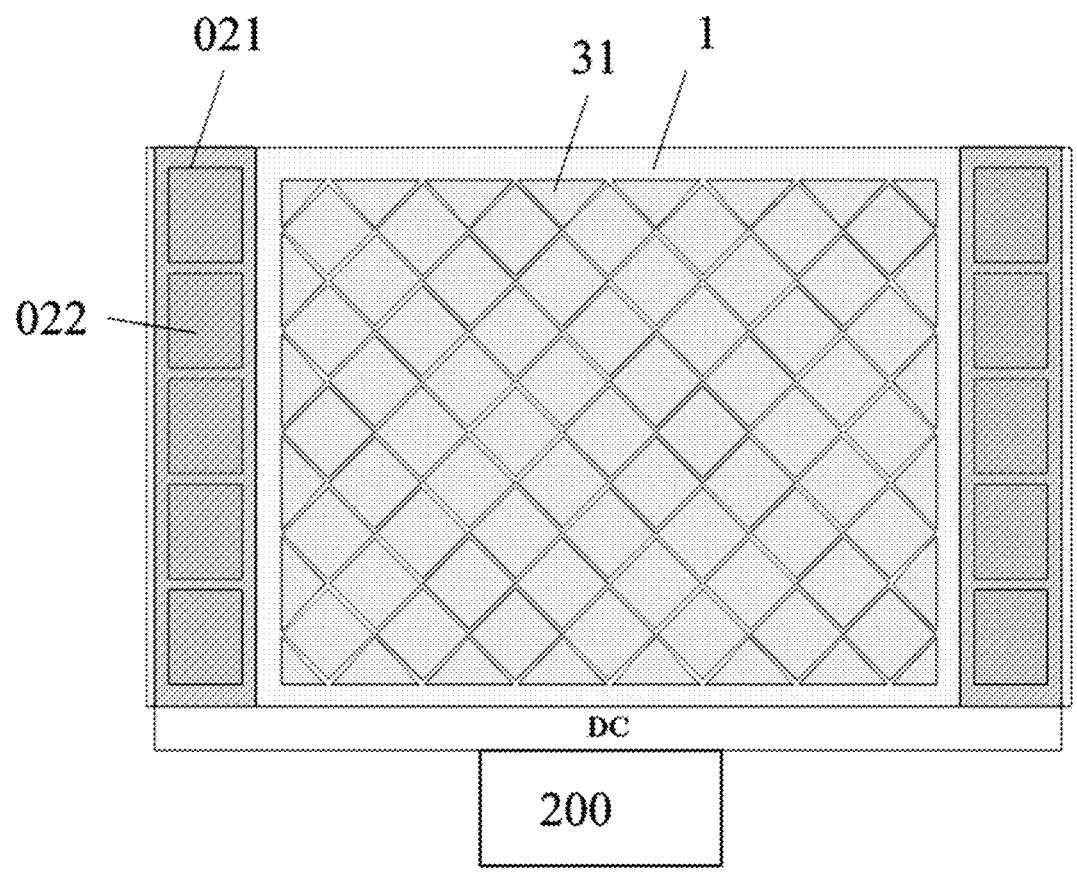
FIG. 2e is a structural diagram of still other structures in a haptic feedback panel according to an embodiment of the present disclosure.
Figure 3:
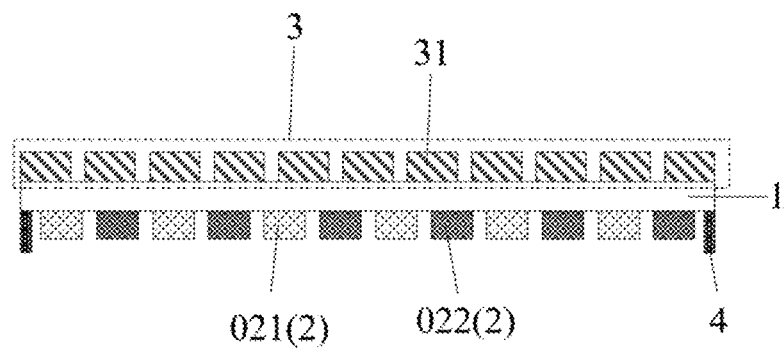
FIG. 3 is a schematic sectional structural view of the haptic feedback panel of FIG. 2a taken along direction CC'.

In some embodiments of the present disclosure, as shown in FIGS. 2a to 3, the haptic feedback panel 100 includes a base substrate 1, a plurality of piezoelectric devices 2 distributed in an array on one side of the base substrate 1, and a touch layer 3 on a side of the base substrate 1 away from the piezoelectric devices 2. The piezoelectric devices 2 are configured to vibrate under driving of a voltage signal, and drive the base substrate 1 to vibrate. By adopting the integrated structure of the base substrate 1 and the touch layer 3, the haptic feedback panel 100 provided in the above embodiment of the present disclosure can implement a touch function (e.g., determining a touch position) and a haptic rendering function.

In some embodiments of the present disclosure, as shown in FIGS. 2a to 3, the touch layer 3 is attached to a surface of the base substrate 1, to provide information such as a touch position for the system during a touch process. Illustratively, the touch layer 3 is divided into a plurality of touch electrodes 31 arranged at intervals. Illustratively, the touch electrodes 31 may be self-capacitance touch electrodes, so that the touch function can be implemented by the self-capacitance technique to determine position coordinates of the touch position. The touch electrodes 31 may be mutual-capacitance touch electrodes, so that the touch function can be implemented by the mutual-capacitance technique to determine position coordinates of the touch position.

In some embodiments of the present disclosure, as shown in FIG. 2a, the piezoelectric devices 2 may be piezoelectric films, and a given voltage signal can provide direct vibrational excitation so that the haptic feedback panel 100 produces a haptic feedback effect. Illustratively, the piezoelectric films are transparent piezoelectric films.

In some embodiments of the present disclosure, as shown in FIGS. 2a to 3, the base substrate 1 is a substrate in direct contact with a touch sense organ such as a finger, and may be a laptop touchpad, a display screen, or the like. Specifically, the base substrate 1 may be a substrate made of glass, a substrate made of silicon or silicon dioxide ($SiO_2$), a substrate made of sapphire, or a substrate made of a metal wafer, which is not limited herein, and those skilled in the art may design the base substrate according to the requirement of the practical application.

Figure 4:
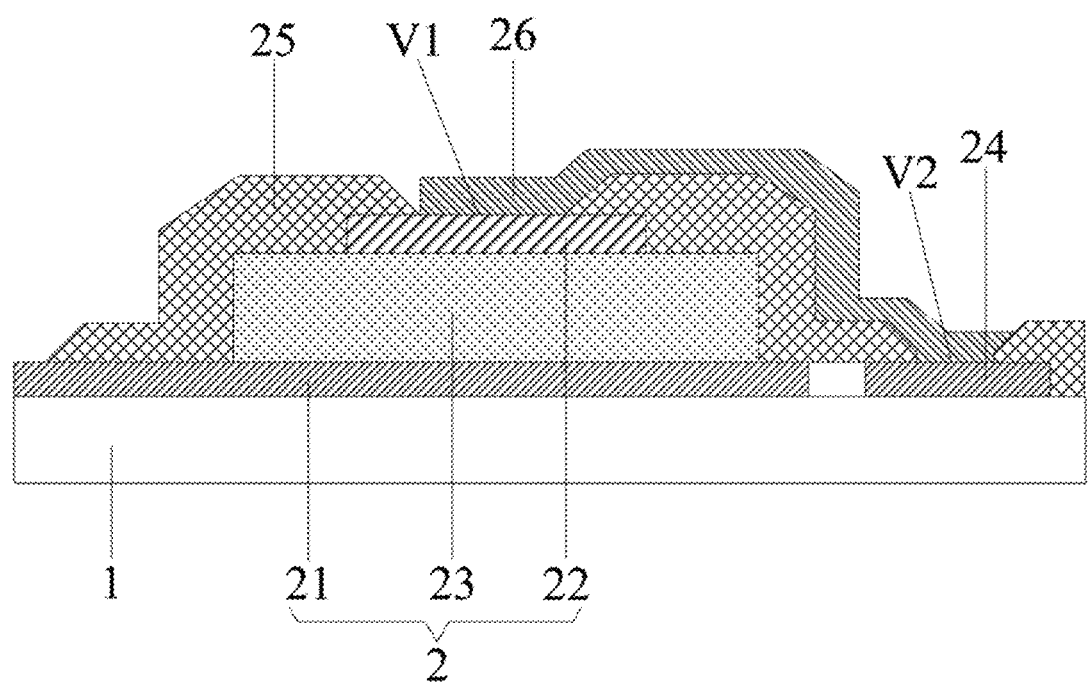
FIG. 4 is a schematic sectional structural view of one piezoelectric device according to an embodiment of the present disclosure.

In some embodiments of the present disclosure, as shown in FIG. 4, a schematic sectional structural view of one piezoelectric device 2 is shown, and the piezoelectric device 2 includes a bottom electrode 21 and a top electrode 22 disposed opposite to each other, a piezoelectric layer 23 between the bottom electrode 21 and the top electrode 22, an insulation layer 5 on a side of the top electrode 22 facing away from the piezoelectric layer 23, and a wiring layer 6 on a side of the insulation layer 25 facing away from the piezoelectric layer 23. The piezoelectric device 2 may further include a bonding electrode 24 disposed in the same layer as the bottom electrode 21 and close to an edge of the base substrate 1. The insulation layer 25 is provided with a first via V1 corresponding to the top electrode 22, one end of the wiring layer 26 is electrically connected to the top electrode 22 through the first via V1, and the other end of the wiring layer 26 is electrically connected to the bonding electrode 24 through a second via V2 running through the insulation layer 25.

In some embodiments of the present disclosure, as shown in FIGS. 2a to 3, the plurality of piezoelectric devices 2 are divided into at least one haptic detection piezoelectric device and at least one haptic drive piezoelectric device. In other words, part of the piezoelectric devices 2 may be provided as haptic detection piezoelectric devices, and the rest may be provided as haptic drive piezoelectric devices. For example, one haptic detection piezoelectric device and one haptic drive piezoelectric device are provided. Alternatively, a plurality of (at least two or more) haptic detection piezoelectric devices and a plurality of haptic drive piezoelectric devices are provided, and the plurality of haptic detection piezoelectric devices 021 and the plurality of haptic drive piezoelectric devices 022 are uniformly distributed on the base substrate 1.

Optionally, as shown in FIG. 2a, the plurality of haptic detection piezoelectric devices 021 and the plurality of haptic drive piezoelectric devices 022 may be arranged on the base substrate 1 in a checkerboard manner.

Optionally, as shown in FIG. 2b, the plurality of haptic detection piezoelectric devices 021 may be divided into multiple columns, the plurality of haptic drive piezoelectric devices 022 may be divided into multiple columns, and the columns of haptic detection piezoelectric devices 021 and the columns of haptic drive piezoelectric devices 022 are alternately arranged. Bottom electrodes 21 of one column of haptic detection piezoelectric devices 021 are arranged at intervals, and bottom electrodes 21 of one column of haptic drive piezoelectric devices 022 are also arranged at intervals. Illustratively, the number of haptic detection piezoelectric devices 021 in each column is smaller than the number of haptic drive piezoelectric devices 022 in each column. Further, a lead electrode 025 in the same layer as the bottom electrode 21 is included, where the lead electrode 025 is electrically connected to the bottom electrode 21 and used for grounding. Moreover, a lead electrode via 41 is formed at a position corresponding to the lead electrode 025, so that an external lead is connected to the lead electrode 025 by silver gel or the like.

Optionally, as shown in FIG. 2c, the plurality of haptic detection piezoelectric devices 021 may be divided into multiple columns, the plurality of haptic drive piezoelectric devices 022 may be divided into multiple columns, and the columns of haptic detection piezoelectric devices 021 and the columns of haptic drive piezoelectric devices 022 are alternately arranged. Moreover, the haptic detection piezoelectric devices 021 and the haptic drive piezoelectric devices 022 are arranged in an array. Bottom electrodes 21 of one column of haptic detection piezoelectric devices 021 are electrically connected with each other, and bottom electrodes 21 of one column of haptic drive piezoelectric devices 022 are also electrically connected with each other. For example, in one column of haptic detection piezoelectric devices 021, a bottom electrode 21-1 of one haptic detection piezoelectric device 021 is electrically connected to a bottom electrode 21-2 through a first connection part 0221, and different bottom electrodes 21-2 are electrically connected with each other through the first connection part 0221. Also, in one column of haptic drive piezoelectric devices 022, a bottom electrode 21-3 of one haptic drive piezoelectric device 022 is electrically connected to a bottom electrode 21-4 through a second connection part 0211, and the bottom electrode 21-4 is electrically connected to another bottom electrode 21-4 through the second connection part 0211.

Optionally, as shown in FIG. 2d, the plurality of haptic detection piezoelectric devices 021 may be divided into multiple columns, the plurality of haptic drive piezoelectric devices 022 may be divided into multiple columns, and the columns of haptic detection piezoelectric devices 021 and the columns of haptic drive piezoelectric devices 022 are alternately arranged. Moreover, the haptic detection piezoelectric devices 021 and the haptic drive piezoelectric devices 022 are arranged in an array. Bottom electrodes 21 of one column of haptic detection piezoelectric devices 021 are arranged at intervals, and bottom electrodes 21 of one column of haptic drive piezoelectric devices 022 are also arranged at intervals. Further, each haptic detection piezoelectric device 021 is connected to a corresponding haptic detection signal line 322, to transmit signals through the haptic detection signal line 322. Each haptic drive piezoelectric device 022 is connected to a corresponding haptic drive signal line 321, to transmit signals through the haptic detection signal line 321.

Optionally, as shown in FIG. 2e, the plurality of haptic detection piezoelectric devices 021 and the plurality of haptic drive piezoelectric devices 022 may be disposed in a non-display region of the display panel. Moreover, the haptic detection piezoelectric devices 021 and the haptic drive piezoelectric devices 022 are alternately arranged in one column. Further, the haptic detection piezoelectric devices 021 and the haptic drive piezoelectric devices 022 may be connected to the drive control circuit 200 through a connection interface DP.

Apparently, the plurality of haptic detection piezoelectric devices and the plurality of haptic drive piezoelectric devices may be disposed on the base substrate 1 in any other arrangement, which is not limited in the present disclosure.

Illustratively, in the haptic detection piezoelectric device, the bottom electrode 21 is grounded, the bonding electrode 24 is connected to a drive detection output, and when the surface of the base substrate 1 is touched by a finger, the top electrode 22 generates an initial voltage signal which may be output through the drive detection output.

Illustratively, in the haptic drive piezoelectric device, the bottom electrode 21 is grounded, the bonding electrode 24 is connected to a driving voltage input, a drive control signal input by the driving voltage input is an alternating voltage signal, and the alternating voltage signal (VAC) is applied to the top electrode 22 through the driving voltage input, so that an alternating electric field can be formed between the top electrode 22 and the bottom electrode 21, and the alternating electric field has the same frequency as the alternating voltage signal. Under an action of the alternating electric field, the piezoelectric layer 23 is deformed and generates a vibration signal having the same frequency as the alternating electric field. When the frequency of the vibration signal is close to or equal to a natural frequency of the base substrate 1, the base substrate 1 resonates with an increasing amplitude, while a haptic feedback signal is generated. When the surface of the base substrate 1 is touched by a finger, notable changes in the friction can be sensed. In practical applications, the friction on the surface of the base substrate 1 can be adjusted by the resonance generated between the piezoelectric layer 23 and the base substrate 1, thereby implementing texture display of the object on the surface of the base substrate 1.

In some embodiments of the present disclosure, the bottom electrode 21 and the bonding electrode 24 may be made of the same material through a single patterning process.

It should be noted that in FIG. 2a, the bottom electrodes 21 of all the piezoelectric devices 2 may be of patterned structures or a full-face structure. The piezoelectric layers 23 of all the piezoelectric devices 2 may be of patterned structures or a full-face structure. The top electrodes 22 of all the piezoelectric devices 2 are patterned structures. For example, the top electrodes 22 of all the piezoelectric devices 2 are patterned structures in one-to-one correspondence with the piezoelectric layers 23.

In one specific implementation, the piezoelectric layer may be made of $Pb(Zr, Ti)O_3$ (PZT), or at least one of AlN, ZnO, $BaTiO_3$, $PbTiO_3$, $KNbO_3$, $LiNbO_3$, $LiTaO_3$ or $La_3Ga_5SiO_{14}$, which can be selected by those skilled in the art based on the actual use requirement and is not limited herein. Where the piezoelectric layer is made of PZT, due to a high piezoelectric coefficient of PZT, the piezoelectric property of the corresponding haptic feedback panel 100 is ensured, and the corresponding haptic feedback panel 100 can be applied to a haptic feedback device, while due to high light transmittance, the PZT can be integrated into a display device without affecting the display quality of the display device.

In one specific implementation, the top electrode and the bottom electrode of the piezoelectric device are made of a transparent conductive material, such as ITO, or IZO, or one of a Ti—Au alloy, a Ti—Al—Ti alloy, or a Ti—Mo alloy, or may be made of one of Ti, Au, Ag, Mo, Cu, W or Cr, which may be selected by those skilled in the art according to the requirement of the practical application, and is not limited herein.

In some embodiments of the present disclosure, as shown in FIGS. 2a to 3, a support layer 4 on the base substrate 1 is further included, and the support layer 4 is disposed on the same side of the base substrate 1 as the piezoelectric devices 2. Specifically, the support layer 4 mainly functions to connect the base substrate 1 and a device. The device may be a support frame or a support plate. Specifically, the device mainly plays a role of supporting the haptic feedback panel 100, and may be a bezel of a display screen, a bezel of a laptop touchpad, or the like. Specifically, the device may be fixedly connected to the support layer 4 by an adhesive layer (e.g., optical clear adhesive, OCA) or the like.

In some embodiments of the present disclosure, the support layer 4 may be made of a material including, but not limited to, at least one of rubber, foam, or Polydimethylsiloxane (PDMS). Specifically, the support layer 4 may be fixedly connected to the base substrate 1 by an adhesive layer (e.g., OCA) or the like. Illustratively, the support layer 4 may include a support part 411 on a periphery of the base substrate 1 and surrounding all the piezoelectric devices 2. Optionally, an orthographic projection of the support layer 4 (support part 411) on the base substrate 1 has a square shape, a triangular shape, a circular shape, a trapezoidal shape, a polygonal shape, or the like. Apparently, the specific position of the support layer 4 is not limited in the present disclosure, and can be determined according to the requirement of the practical application, which is not limited herein.

In some embodiments of the present disclosure, as shown in FIG. 1, the drive control circuit 200 includes:

a feedback detection circuit 210 coupled to at least one haptic detection piezoelectric device in the haptic feedback panel 100, the feedback detection circuit 210 being configured to, when a target object presses on the haptic feedback panel, process an initial voltage signal of each of at least one haptic detection piezoelectric device, and output a detection signal corresponding to each of the at least one haptic detection piezoelectric device;

a data processing circuit 220 coupled to the feedback detection circuit, the data processing circuit 220 being configured to receive the detection signal corresponding to each of the at least one haptic detection piezoelectric device, and output a drive enable signal according to the detection signal corresponding to each of the at least one haptic detection piezoelectric device and a set threshold; and a feedback drive circuit 230 coupled to the at least one haptic drive piezoelectric device in the haptic feedback panel 100 and the data processing circuit 220, the feedback drive circuit being configured to receive the drive enable signal, and output a drive control signal to the at least one haptic drive piezoelectric device according to the drive control signal.

According to the drive control circuit provided in the embodiments of the present disclosure, through provision the feedback detection circuit, the data processing circuit and the feedback drive circuit, the feedback detection circuit, the data processing circuit and the feedback drive circuit can cooperate with each other to output a drive control signal to the at least one haptic drive piezoelectric device, so that the friction on the surface of the base substrate can be adjusted by the resonance generated between the piezoelectric layer and the base substrate, thereby implementing texture display of the object on the surface of the base substrate.

Figure 5:
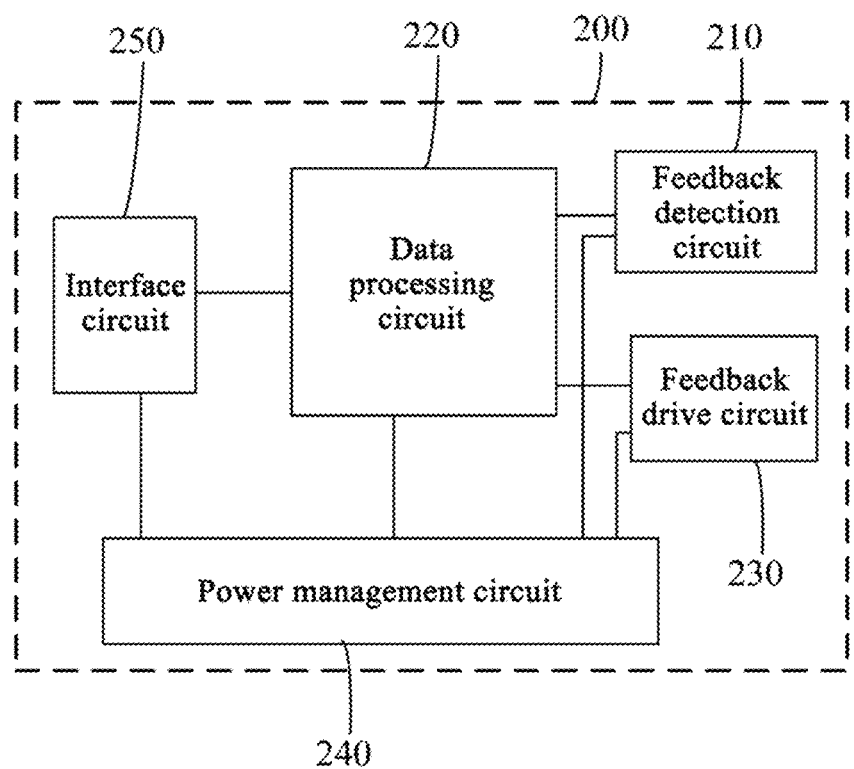
FIG. 5 is a schematic diagram of some structures in a drive control circuit according to an embodiment of the present disclosure.

In some embodiments of the present disclosure, as shown in FIG. 5, the drive control circuit 200 further includes a power management circuit 240 and an interface circuit 250. The power management circuit 240 is configured to provide a supply voltage for the feedback detection circuit 210, the data processing circuit 220, and the feedback drive circuit 230. The data processing circuit 220 is coupled to the touch drive circuit through the interface circuit 250.

Illustratively, the power management circuit may be a power management integrated circuit (PMIC). Apparently, in practical applications, the specific structure of the power management circuit is not limited herein, and any other circuit capable of implementing the function may be used.

Illustratively, the interface circuit may include a universal serial bus (USB) interface, a high definition multimedia interface (HDMI), or the like, which is not limited herein.

When the haptic feedback panel is used by a user, the manipulation is performed with a finger in most cases, and therefore, in the embodiment of the present disclosure, the target object may be a finger. Apparently, in practical applications, the target object may include other objects, which is not limited herein.

In some embodiments of the present disclosure, the data processing circuit 220 is further configured to determine a detection comparison value according to the detection signal and a weight corresponding to each of the at least one haptic detection piezoelectric device. When the detection comparison value is not less than the set threshold, the drive enable signal is output to implement a driving process of texture display. When the detection comparison value is less than the set threshold, no drive enable signal is output, i.e., the driving process of texture display is not performed. Illustratively, when the detection comparison value is not less than the set threshold, a corresponding drive enable signal is output according to the position coordinates where the finger presses on the haptic feedback panel and image information displayed at the pressed position of the finger.

In some embodiments of the present disclosure, M haptic detection piezoelectric devices are provided in the haptic feedback panel 100, that is, the total number of haptic detection piezoelectric devices is M. The M haptic detection piezoelectric devices are defined as a $1^{st}$ haptic detection piezoelectric device 021_1 to an $M^{th}$ haptic detection piezoelectric device 021_M. Then, the $m^{th}$ haptic detection piezoelectric device 021_m may be any one of the $1^{st}$ haptic detection piezoelectric device 021_1 to the $M^{th}$ haptic detection piezoelectric device 021_M. That is, $1 \leq m \leq M$, and M and m are both integers. It should be noted that M may be set to 16, 20, 30 or more. In practical applications, the specific value of M may be determined according to the requirement of the practical application, which is not limited herein.

In some embodiments of the present disclosure, the detection comparison value is determined by:

$$FS = a_1 * f_1 + a_2 * f_2 + a_3 * f_3 + \ldots\ldots a_{M-1} * F_{M-1} + a_M * F_M;$$

where FS represents the detection comparison value, $a_m$ represents a weight corresponding to an $m^{th}$ haptic detection piezoelectric device, and $f_m$ represents the detection signal corresponding to the $m^{th}$ haptic detection piezoelectric device.

In some embodiments of the present disclosure, the data processing circuit 220 is further configured to acquire position coordinates where the target object presses on the haptic feedback panel, determine a press distance between the position coordinates where the target object presses on the haptic feedback panel and each of the at least one haptic detection piezoelectric device (e.g., a center of the haptic detection piezoelectric device), and determine, according to the press distance of each of the at least one haptic detection piezoelectric device, the weight corresponding to each of the at least one haptic detection piezoelectric device. Illustratively, taking the target object being a finger and a plurality of haptic detection piezoelectric devices being provided as an example, when the finger presses on the haptic feedback panel 100, position coordinates of the pressed position of the finger can be determined by a touch electrode. Since some haptic detection piezoelectric devices are closer to the finger pressed position and some haptic detection piezoelectric devices are farther from the finger pressed position, the haptic detection piezoelectric devices closer to the finger pressed position corresponding to detection signals more accurate than the haptic detection piezoelectric devices farther from the finger pressed position. Therefore, to improve the accuracy of the detection comparison value, the weight may be correlated with the distance between the haptic detection piezoelectric device and the finger pressed position. Specifically, after acquiring the position coordinates, the data processing circuit 220 may determine a press distance between the position coordinates and each haptic detection piezoelectric device (e.g., the center of the haptic detection piezoelectric device), so as to determine a weight corresponding to each haptic detection piezoelectric device according to the press distance of each haptic detection piezoelectric device. In this manner, the weight in the detection comparison value is correlated with the press distance, and the accuracy of the detection comparison value can be further improved.

To implement the touch function, in some embodiments of the present disclosure, the drive control circuit 200 further includes a touch drive circuit. The touch drive circuit is coupled to a plurality of touch electrodes in the haptic feedback panel 100, and configured to, when the target object presses on the haptic feedback panel, acquire touch voltage signals on the touch electrodes, and determine position coordinates where the target object presses on the haptic feedback panel according to the acquired touch voltage signals. Moreover, the data processing circuit 220 is further configured to acquire the position coordinates where the target object presses on the haptic feedback panel from the touch drive circuit.

Illustratively, the haptic feedback panel 100 further has display pixels to implement the function of displaying an image. Optionally, the touch drive circuit may be a touch drive IC capable of implementing a touch drive function. The drive control circuit 200 may further include a display drive IC capable of implementing a display drive function and configured to drive the haptic feedback panel 100 to display an image. Alternatively, the touch drive circuit may be a display drive IC capable of implementing a display drive function and a touch drive function. In other words, the touch drive circuit may be further configured to drive the haptic feedback panel 100 to display an image.

In some embodiments of the present disclosure, the data processing circuit 220 may acquire the position coordinates where the target object presses on the haptic feedback panel from the touch drive circuit through an interface circuit, and may output display information through the interface circuit. For example, the data processing circuit 220 may output display information to the display drive IC through the interface circuit.

Figure 6:
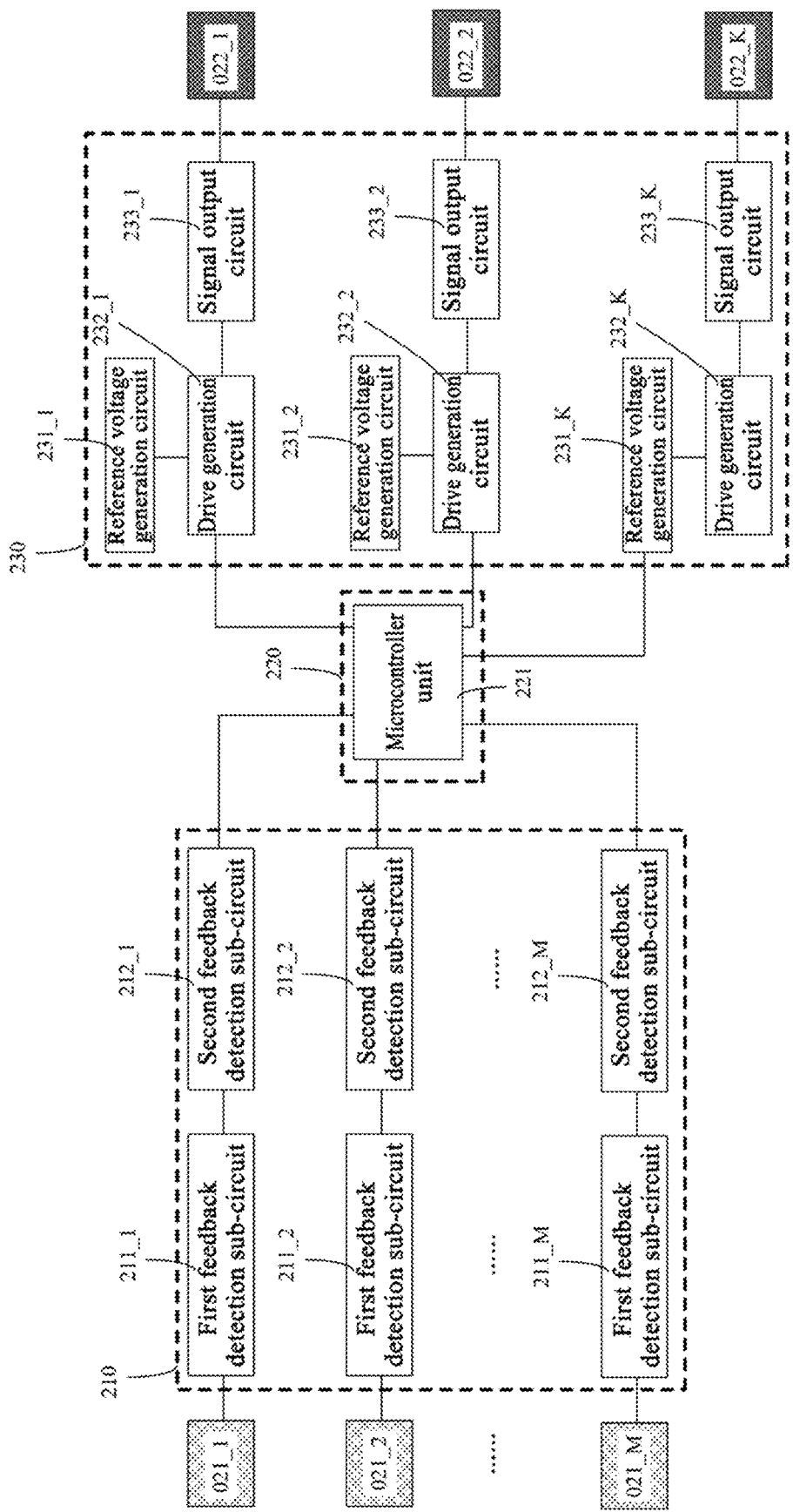
FIG. 6 is a schematic diagram of some other structures in a drive control circuit according to an embodiment of the present disclosure.

Illustratively, as shown in FIG. 6, the data processing circuit 220 may be configured as a microcontroller unit (MCU).

In some embodiments of the present disclosure, the feedback detection circuit may include at least one first feedback detection sub-circuit, and at least one second feedback detection sub-circuit. The at least one haptic detection piezoelectric device, the at least one first feedback detection sub-circuit, and the at least one second feedback detection sub-circuit are in one-to-one correspondence. Illustratively, taking the case of providing a plurality of haptic detection piezoelectric devices as an example, as shown in FIG. 6, the feedback detection circuit includes a plurality of first feedback detection sub-circuits 211_m, and a plurality of second feedback detection sub-circuits 212_m. The plurality of haptic detection piezoelectric devices 021_m, the plurality of first feedback detection sub-circuits 211_m, and the plurality of second feedback detection sub-circuits 212_m are in one-to-one correspondence. For example, a haptic detection piezoelectric device 021_1, a first feedback detection sub-circuit 211_1, and a second feedback detection sub-circuit 212_1 are correspondingly arranged, a haptic detection piezoelectric device 021_2, a first feedback detection sub-circuit 211_2, and a second feedback detection sub-circuit 212_2 are correspondingly arranged, . . . , and a haptic detection piezoelectric device 021_M, a first feedback detection sub-circuit 211_M, and a second feedback detection sub-circuit 212_M are correspondingly arranged.

In some embodiments of the present disclosure, as shown in FIG. 6, a first feedback detection sub-circuit 211_m is coupled to a corresponding haptic detection piezoelectric device 021_m, and a second feedback detection sub-circuit 212_m is coupled to a corresponding first feedback detection sub-circuit 211_m. Specifically, the first feedback detection sub-circuit 211_m is coupled to a top electrode 22 in the haptic detection piezoelectric device 021_m through a drive detection output. Moreover, the first feedback detection sub-circuit 211_m is configured to, when the target object presses on the haptic feedback panel, amplify an initial voltage signal of the coupled haptic detection piezoelectric device 021_m, generate a target amplified voltage signal, and output the generated target amplified voltage signal. The second feedback detection sub-circuit 212_m is configured to receive the target amplified voltage signal, perform analog-to-digital conversion on the target amplified voltage signal to generate the detection signal, and output the generated detection signal.

In some embodiments of the present disclosure, K haptic drive piezoelectric devices are provided in the haptic feedback panel 100, that is, the total number of the provided haptic drive piezoelectric devices is K. The K haptic drive piezoelectric devices are defined as a $1^{st}$ haptic drive piezoelectric device 022_1 to a $K^{th}$ haptic drive piezoelectric device 022_K. Then, the $k^{th}$ haptic drive piezoelectric device 022_k may be any one of the $1^{st}$ haptic drive piezoelectric device 022_1 to the $K^{th}$ haptic drive piezoelectric device 022_K. That is, $1 \leq k \leq K$, and K and k are both integers. It should be noted that K may be set to 6, 16, 20, 30 or more. In practical applications, the specific value of K may be determined according to the requirement of the practical application, which is not limited here.

In some embodiments of the present disclosure, the feedback drive circuit may include at least one reference voltage generation circuit, at least one drive generation circuit, and at least one signal output circuit. The at least one reference voltage generation circuit, the at least one drive generation circuit, the at least one signal output circuit, and the at least one haptic drive piezoelectric device are in one-to-one correspondence. Illustratively, taking the case of providing a plurality of haptic drive piezoelectric devices as an example, as shown in FIG. 6, the feedback drive circuit includes a plurality of reference voltage generation circuits 231_k, a plurality of drive generation circuits 232_k, and a plurality of signal output circuits 233_k. The plurality of reference voltage generation circuits 231_k, the plurality of drive generation circuits 232_k, the plurality of signal output circuits 233_k, and the plurality of haptic drive piezoelectric devices 022_k are in one-to-one correspondence. For example, a reference voltage generation circuit 231_1, a drive generation circuit 232_1, a signal output circuit 233_1, and a haptic drive piezoelectric device 022_1 are correspondingly arranged, a reference voltage generation circuit 231_2, a drive generation circuit 232_2, a signal output circuit 233_2, and a haptic drive piezoelectric device 022_2 are correspondingly arranged, . . . , and a reference voltage generation circuit 231_K, a drive generation circuit 232_K, a signal output circuit 233_K, and a haptic drive piezoelectric device 022_K are correspondingly arranged.

In some embodiments of the present disclosure, as shown in FIG. 6, the reference voltage generation circuit 231_k is coupled to a reference power supply terminal VCCA and the drive generation circuit 232_k, the drive generation circuit 232_k is coupled to the data processing circuit 220, and the signal output circuit 233_k is coupled to the drive generation circuit 232_k. The reference voltage generation circuit 231_k is configured to generate a reference voltage according to the reference power supply terminal VCCA. The drive generation circuit 232_k is configured to receive the drive enable signal and the reference voltage, generate an initial control signal according to the drive enable signal and the reference voltage, and output the initial control signal. The signal output circuit 233_k is configured to receive the initial control signal, perform boosting on the initial control signal to generate the drive control signal, and output the drive control signal to the correspondingly coupled haptic drive piezoelectric device 022_k. Illustratively, the reference voltage generation circuit 231_k is configured to reduce a voltage of the reference power supply terminal VCCA (e.g., 5V) to generate a reference voltage (e.g., 2.5V).

The drive control circuit 200 provided in the embodiments of the present disclosure will be described in detail below with reference to specific embodiments. It should be noted that the following embodiments are merely for the purpose of better explaining the present disclosure, instead of limiting the present disclosure.

Figure 7:
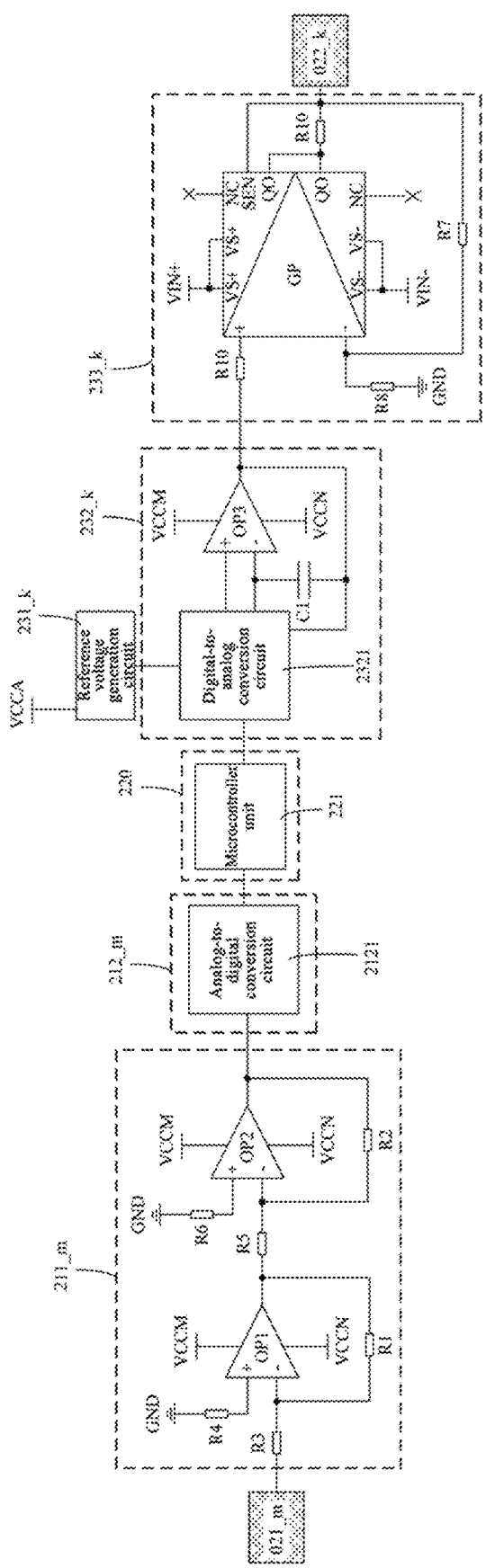
FIG. 7 is a schematic diagram of still other structures in a drive control circuit according to an embodiment of the present disclosure.

In some embodiments of the present disclosure, as shown in FIG. 7, the first feedback detection sub-circuit 211_m includes a first amplifier OP1 and a second amplifier OP2. A first input of the first amplifier OP1 is coupled to a corresponding haptic detection piezoelectric device 021_m, a second input of the first amplifier OP1 is coupled to a ground terminal GND, an output of the first amplifier OP1 is coupled to a first input of the second amplifier OP2, a second input of the second amplifier OP2 is coupled to the ground terminal GND, and an output of the second amplifier OP2 is coupled to the data processing circuit 220. Illustratively, the first input of the first amplifier OP1 is an inverting input, the second input of the first amplifier OP1 is a non-inverting input, the first input of the second amplifier OP2 is an inverting input, and the second input of the second amplifier OP2 is a non-inverting input.

It should be noted that, in FIG. 7, a non-inverting input is denoted by "+", and an inverting input is denoted by "−".

In some embodiments of the present disclosure, as shown in FIG. 7, the first feedback detection sub-circuit 211_m further includes a first resistor R1 and a second resistor R2. A first end of the first resistor R1 is coupled to the inverting input of the first amplifier OP1, and a second end of the first resistor R1 is coupled to the output of the first amplifier OP1. A first end of the second resistor R2 is coupled to the inverting input of the second amplifier OP2, and a second end of the second resistor R2 is coupled to the output of the second amplifier OP2.

In some embodiments of the present disclosure, as shown in FIG. 7, the first feedback detection sub-circuit 211_m further includes a third resistor R3. The first input of the first amplifier OP1 is coupled to the corresponding haptic detection piezoelectric device 021_m through the third resistor R3. Specifically, a first end of the third resistor R3 is coupled to a top electrode of the corresponding haptic detection piezoelectric device 021_m, and a second end of the third resistor R3 is coupled to the first input of the first amplifier OP1.

In some embodiments of the present disclosure, as shown in FIG. 7, the first feedback detection sub-circuit 211_m further includes a fourth resistor R4. The second input of the first amplifier OP1 is coupled to the ground terminal GND through the fourth resistor R4. Specifically, a first end of the fourth resistor R4 is coupled to the ground terminal GND, and a second end of the fourth resistor R4 is coupled to the second input of the first amplifier OP1.

In some embodiments of the present disclosure, as shown in FIG. 7, the first feedback detection sub-circuit 211_m further includes a fifth resistor R5. The output of the first amplifier OP1 is coupled to the first input of the second amplifier OP2 through the fifth resistor R5. Specifically, a first end of the fifth resistor R5 is coupled to the output of the first amplifier OP1, and a second end of the fifth resistor R5 is coupled to the first input of the second amplifier OP2.

In some embodiments of the present disclosure, as shown in FIG. 7, the first feedback detection sub-circuit 211_m further includes a sixth resistor R6. The second input of the second amplifier OP2 is coupled to the ground terminal GND through the sixth resistor R6. Specifically, a first end of the sixth resistor R6 is coupled to the ground terminal GND, and a second end of the sixth resistor R6 is coupled to the second input of the second amplifier OP2.

In some embodiments of the present disclosure, as shown in FIG. 7, the second feedback detection sub-circuit 212_m includes an analog-to-digital conversion circuit 2121. An input of the analog-to-digital conversion circuit 2121 is coupled to the first feedback detection sub-circuit 211_m, and an output of the analog-to-digital conversion circuit 2121 is coupled to the data processing circuit 220. Specifically, the input of the analog-to-digital conversion circuit 2121 is coupled to the output of the second amplifier in the first feedback detection sub-circuit 211_m.

Illustratively, the analog-to-digital conversion circuit 2121 is an analog-to-digital converter (ADC).

In some embodiments of the present disclosure, as shown in FIG. 7, the drive generation circuit 232_k includes a digital-to-analog conversion circuit 2321, a third amplifier OP3, and a first capacitor C1. A signal input of the digital-to-analog conversion circuit 2321 is coupled to the data processing circuit 220, a reference voltage input of the digital-to-analog conversion circuit 2321 is coupled to the reference voltage generation circuit 231_k, an output of the digital-to-analog conversion circuit 2321 is coupled to a non-inverting input of the third amplifier OP3, a comparison voltage terminal of the digital-to-analog conversion circuit 2321 is coupled to an inverting input of the third amplifier OP3, and a reference signal terminal of the digital-to-analog conversion circuit 2321 is coupled to an output of the third amplifier OP3. The output of the third amplifier OP3 is coupled to the signal output circuit 233_k. A first end of the first capacitor C1 is coupled to the inverting input of the third amplifier OP3, and a second end of the first capacitor C1 is coupled to the output of the third amplifier OP3.

Illustratively, the digital-to-analog conversion circuit 2321 is a digital-to-analog converter (DAC).

In some embodiments of the present disclosure, as shown in FIG. 7, the signal output circuit 233_k includes a high voltage operational amplifier GP. A first input of the high voltage operational amplifier GP is coupled to the drive generation circuit 232_k, a second input of the high voltage operational amplifier GP is coupled to the ground terminal GND, and an output of the high voltage operational amplifier GP is coupled to a corresponding haptic drive piezoelectric device 022_k. Specifically, the first input of the high voltage operational amplifier GP is coupled to the output of the third amplifier in the drive generation circuit 232_k, and the output of the high voltage operational amplifier GP is coupled to a top electrode of the corresponding haptic drive piezoelectric device 022_k. Optionally, the first input of the high voltage operational amplifier GP is a non-inverting input, and the second input of the high voltage operational amplifier GP is an inverting input.

In some embodiments of the present disclosure, as shown in FIG. 7, the signal output circuit 233_k further includes a seventh resistor R7. A first end of the seventh resistor R7 is coupled to the inverting input of the high voltage operational amplifier GP, and a second end of the seventh resistor R7 is coupled to the output of the high voltage operational amplifier GP.

In some embodiments of the present disclosure, as shown in FIG. 7, the signal output circuit 233_k further includes an eighth resistor R8. The second input of the high voltage operational amplifier GP is coupled to the ground terminal GND through the eighth resistor R8. Specifically, a first end of the eighth resistor R8 is coupled to the ground terminal GND, and a second end of the eighth resistor R8 is coupled to the second input of the high voltage operational amplifier GP.

In some embodiments of the present disclosure, as shown in FIG. 7, the signal output circuit 233_k further includes a ninth resistor R9. The output of the high voltage operational amplifier GP is coupled to the haptic drive piezoelectric device 022_k through the ninth resistor R9. Specifically, a first end of the ninth resistor R9 is coupled to the output of the high voltage operational amplifier GP, and a second end of the ninth resistor R9 is coupled to a top electrode of the corresponding haptic drive piezoelectric device 022_k.

In some embodiments of the present disclosure, as shown in FIG. 7, the signal output circuit 233_k further includes a tenth resistor R10. The first input of the high voltage operational amplifier GP is coupled to the drive generation circuit 232_k through the tenth resistor R10. Specifically, a first end of the tenth resistor R10 is coupled to the output of the third amplifier in the drive generation circuit 232_k, and a second end of the tenth resistor R10 is coupled to the first input of the high voltage operational amplifier GP.

Illustratively, the high voltage operational amplifier GP further has two VS+ terminals, two VS-terminals, two NC terminals, two outputs QO, and an SEN terminal. The two VS+ terminals are both coupled to a VIN+ voltage terminal, the two VS- terminals are both coupled to a VIN- voltage terminal, the two NC terminals are floating without being connected to any other component, the two outputs QO are coupled to each other and coupled to the first end of the tenth resistor R10, and the SEN terminal is coupled to the second end of the tenth resistor R10.

Illustratively, resistance values of the various resistors described above are not limited herein, and may be determined according to the requirement of the practical application.

Illustratively, the first amplifier OP1, the second amplifier OP2, and the third amplifier OP3 are further coupled to a first reference voltage terminal VCCM and a second reference voltage terminal VCCN. The first reference voltage terminal VCCM may be a high level voltage, such as a positive voltage. The second reference voltage terminal VCCN may be a low level voltage, such as a negative voltage or a ground voltage.

Figure 8:
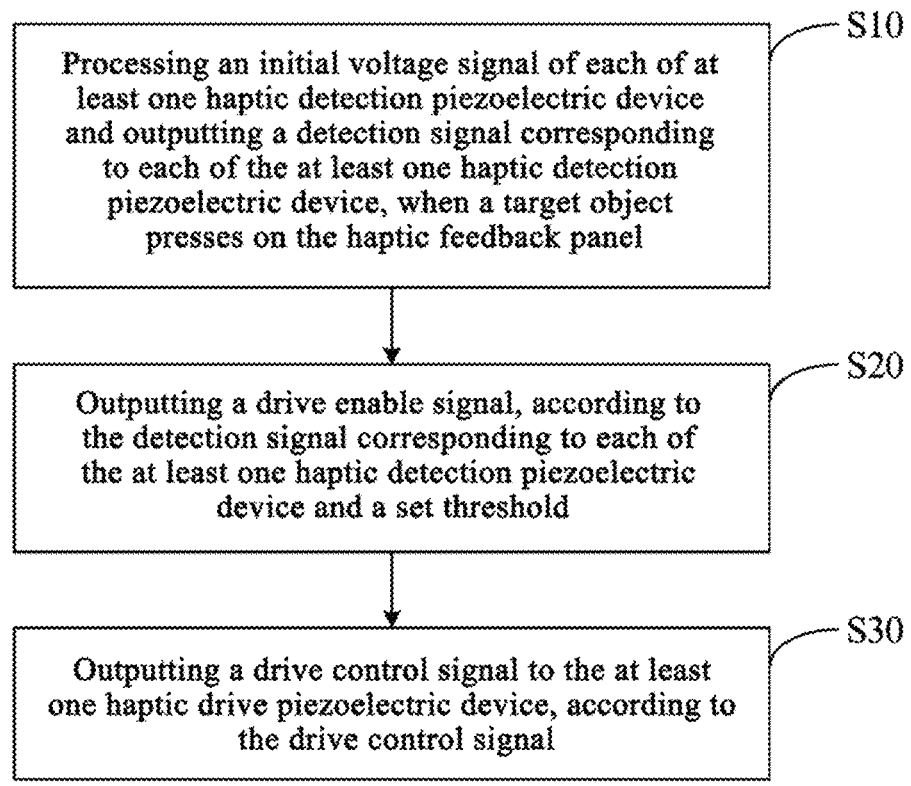
FIG. 8 is a flowchart of a method for driving a drive control circuit according to an embodiment of the present disclosure.

An embodiment of the present disclosure further provides a method for driving a drive control circuit, which, as shown in FIG. 8, includes the following steps S10 to S30.

At S10, processing an initial voltage signal of each of at least one haptic detection piezoelectric device and outputting a detection signal corresponding to each of the at least one haptic detection piezoelectric device, when a target object presses on the haptic feedback panel.

At S20, outputting a drive enable signal, according to the detection signal corresponding to each of the at least one haptic detection piezoelectric device and a set threshold.

At S30, outputting a drive control signal to at least one haptic drive piezoelectric device, according to the drive control signal.

Taking the structure of the drive control circuit 200 shown in FIG. 7 as an example, an operating process of the drive control circuit 200 provided in the embodiments of the present disclosure will be described below.

When a finger presses on the haptic feedback panel 100, the top electrode 22 of the haptic detection piezoelectric device 021_m generates an initial voltage signal, which may be output to the first amplifier OP1 through the drive detection output. The first amplifier OP1 performs a first amplification on the initial voltage signal to generate an initial amplified voltage signal, and inputs the initial amplified voltage signal to the second amplifier OP2. The second amplifier OP2 amplifies the initial amplified voltage signal to generate a target amplified voltage signal, and output the generated target amplified voltage signal to the analog-to-digital conversion circuit 2121. Since the amplified voltage signal is an analog voltage signal, after being input to the analog-to-digital conversion circuit 2121, the amplified voltage signal may be converted into a digital voltage signal through analog-to-digital conversion, so that the generated detection signal is the converted digital voltage signal. The detection signal in the form of the digital voltage signal is output to the MCU 221.

Further, when the finger presses on the haptic feedback panel 100, the touch drive circuit may acquire touch voltage signals on the touch electrodes, and determine position coordinates where the target object presses on the haptic feedback panel according to the acquired touch voltage signals. The MCU 221 acquires the position coordinates where the finger presses on the haptic feedback panel from the touch drive circuit, determines a press distance between the position coordinates where the finger presses on the haptic feedback panel and each haptic detection piezoelectric device, and then determines a weight corresponding to each haptic detection piezoelectric device according to the press distance of each haptic detection piezoelectric device. The MCU determines a detection comparison value by: FS=a1*f1+a2*f2+a3*f3+ . . . aM−1*FM−1+aM*FM. When the detection comparison value is not less than a set threshold, a corresponding drive enable signal is output according to the position coordinates where the finger presses on the haptic feedback panel and image information displayed at the pressed position of the finger, so as to implement a corresponding driving process of texture display at the finger pressed position. When the detection comparison value is less than the set threshold, no drive enable signal is output, i.e., the driving process of texture display is not performed.

The digital-to-analog conversion circuit 2321 receives the drive enable signal in the form of the digital voltage signal output from the MCU 221 and the reference voltage generated by the reference voltage generation circuit, and generates a transition control signal in the form of an analog voltage signal. The transition control signal is input to the third amplifier OP3 for amplification to generate an initial control signal, which is then output to the high voltage operational amplifier GP. The high voltage operational amplifier GP boosts the initial control signal to generate a drive control signal, and outputs the drive control signal to the top electrode of the correspondingly coupled haptic drive piezoelectric device 022_k, so that the friction on the surface of the base substrate can be adjusted by the resonance generated between the piezoelectric layer and the base substrate, thereby implementing texture display of the object on the surface of the base substrate.

Figure 9:
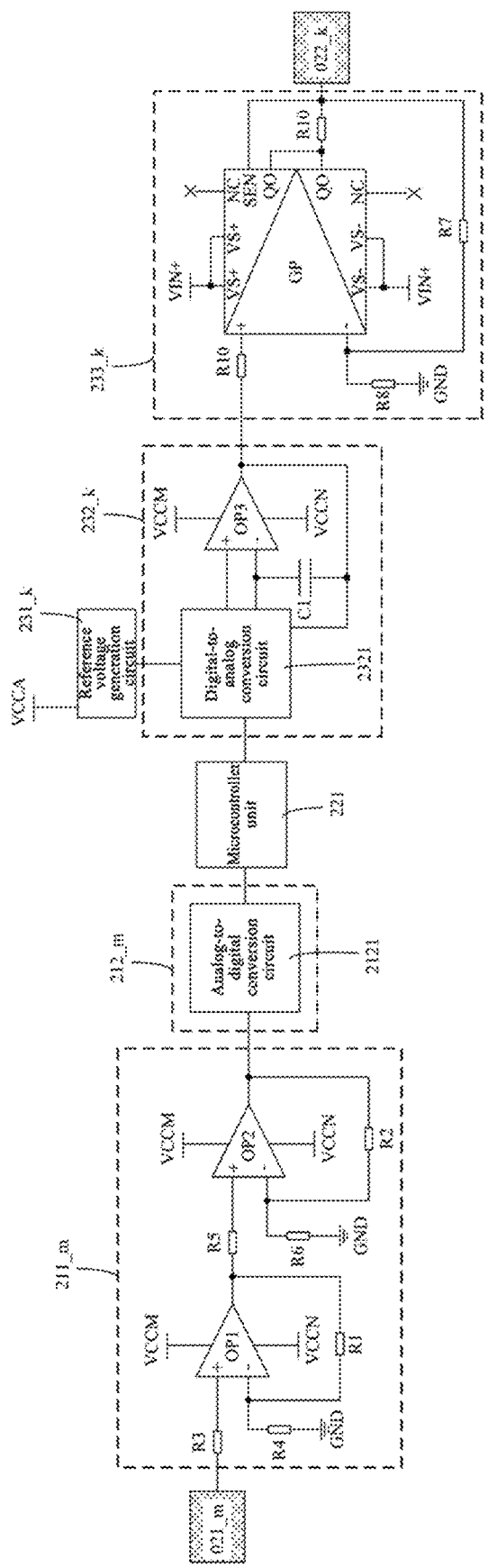
FIG. 9 is a schematic diagram of still other structures in a drive control circuit according to an embodiment of the present disclosure.

An embodiment of the present disclosure provides a structural diagram of some other structures in the drive control circuit. As shown in FIG. 9, variations are made on the implementations in the above embodiments. Only differences between the present embodiment and the above embodiments will be described below, and the same parts will not be repeated here.

In the embodiment of the present disclosure, as shown in FIG. 9, the first input of the first amplifier OP1 in the drive control circuit 200 is a non-inverting input, the second input of the first amplifier OP1 in the drive control circuit 200 is an inverting input, the first input of the second amplifier OP2 in the drive control circuit 200 is a non-inverting input, and the second input of the second amplifier OP2 in the drive control circuit 200 is an inverting input.

It should be noted that the operating process of the drive control circuit shown in FIG. 9 may refer to the description of the operating process of the foregoing drive control circuit, and is not repeated here.

Figure 10:
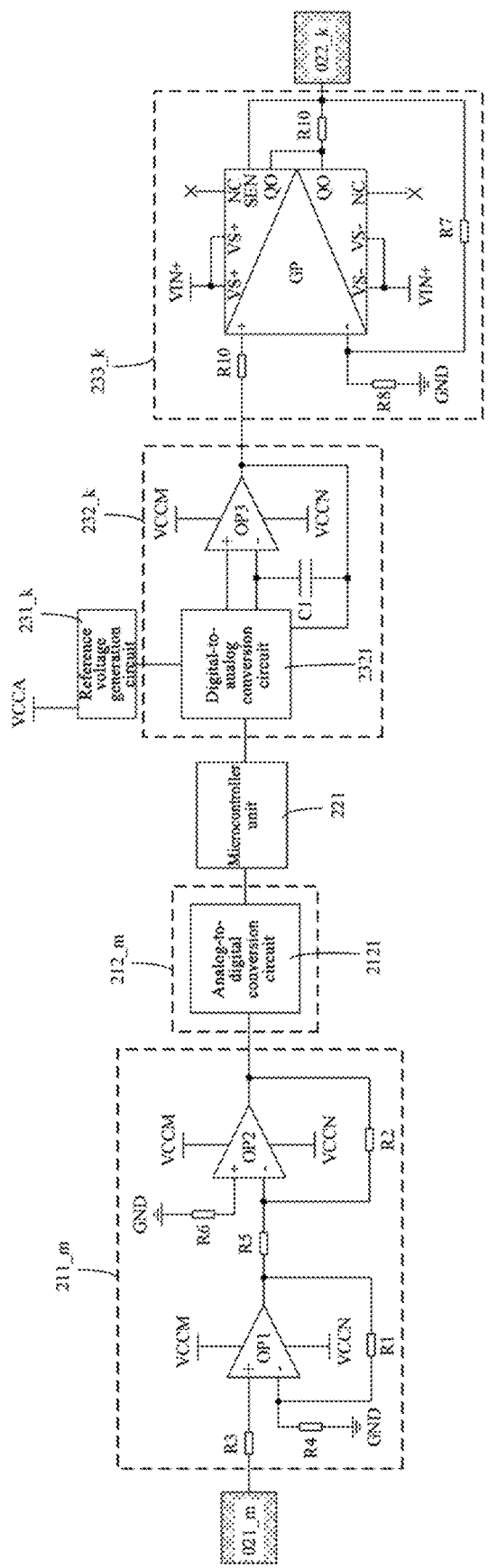
FIG. 10 is a schematic diagram of still other structures in a drive control circuit according to an embodiment of the present disclosure.

An embodiment of the present disclosure provides a structural diagram of still other structures in the drive control circuit. As shown in FIG. 10, variations are made on the implementations in the above embodiments. Only differences between the present embodiment and the above embodiments will be described below, and the same parts will not be repeated here.

In the embodiment of the present disclosure, as shown in FIG. 10, the first input of the first amplifier OP1 in the drive control circuit 200 is a non-inverting input, the second input of the first amplifier OP1 in the drive control circuit 200 is an inverting input, the first input of the second amplifier OP2 in the drive control circuit 200 is an inverting input, and the second input of the second amplifier OP2 in the drive control circuit 200 is a non-inverting input.

It should be noted that the operating process of the drive control circuit shown in FIG. 10 may refer to the description of the operating process of the foregoing drive control circuit, and is not repeated here.

Figure 11:
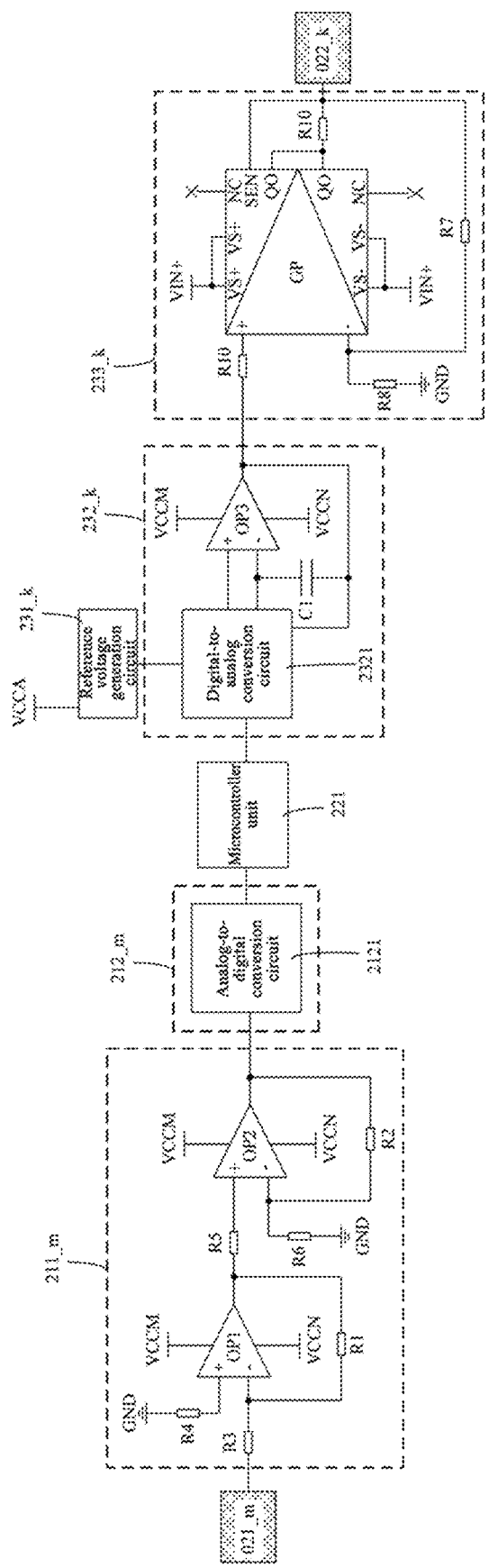
FIG. 11 is a schematic diagram of still other structures in a drive control circuit according to an embodiment of the present disclosure.

An embodiment of the present disclosure provides a structural diagram of still other structures in the drive control circuit. As shown in FIG. 11, variations are made on the implementations in the above embodiments. Only differences between the present embodiment and the above embodiments will be described below, and the same parts will not be repeated here.

In the embodiment of the present disclosure, as shown in FIG. 11, the first input of the first amplifier OP1 in the drive control circuit 200 is an inverting input, the second input of the first amplifier OP1 in the drive control circuit 200 is a non-inverting input, the first input of the second amplifier OP2 in the drive control circuit 200 is a non-inverting input, and the second input of the second amplifier OP2 in the drive control circuit 200 is an inverting input.

It should be noted that the operating process of the drive control circuit shown in FIG. 11 may refer to the description of the operating process of the foregoing drive control circuit, and is not repeated here.

Figure 12:
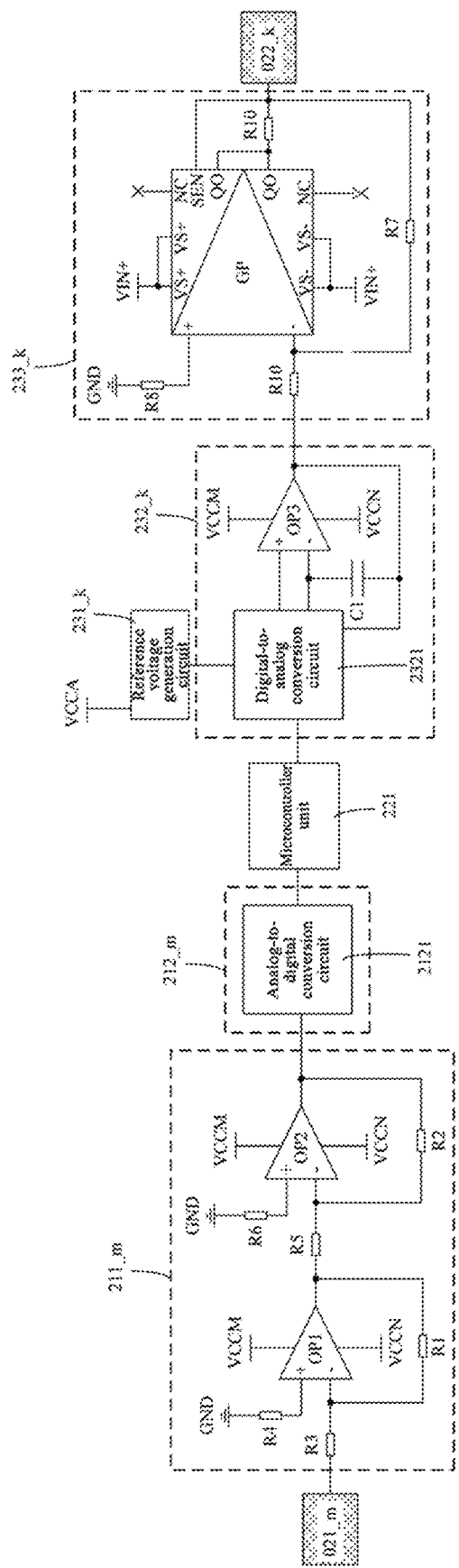
FIG. 12 is a schematic diagram of still other structures in a drive control circuit according to an embodiment of the present disclosure.

An embodiment of the present disclosure provides a structural diagram of still other structures in the drive control circuit. As shown in FIG. 12, variations are made on the implementations in the above embodiments. Only differences between the present embodiment and the above embodiments will be described below, and the same parts will not be repeated here.

In the embodiment of the present disclosure, as shown in FIG. 12, the first input of the high voltage operational amplifier GP in the drive control circuit 200 is an inverting input, and the second input of the high voltage operational amplifier GP in the drive control circuit 200 is a non-inverting input.

It should be noted that the operating process of the drive control circuit shown in FIG. 12 may refer to the description of the operating process of the foregoing drive control circuit, and is not repeated here.

While the preferred embodiments of the present disclosure have been described, additional changes and modifications to those embodiments may occur to those skilled in the art once they learn about the basic inventive concepts. Therefore, it is intended that the appended claims should be interpreted as including the preferred embodiments and all changes and modifications that fall within the scope of the present disclosure.

It will be apparent to those skilled in the art that various changes and variations may be made to the embodiments of the present disclosure without departing from the spirit and scope of the embodiments of the present disclosure. Therefore, if such modifications and variations to the embodiments of the present disclosure are within the scope of the claims of the present disclosure and their equivalents, the present disclosure is also intended to encompass such modifications and variations.

What is claimed is:

1. A drive control circuit, comprising:
a feedback detection circuit coupled to at least one haptic detection piezoelectric device in a haptic feedback panel, the feedback detection circuit being configured to, when a target object presses on the haptic feedback panel, process an initial voltage signal of each of the at least one haptic detection piezoelectric device, and output a detection signal corresponding to each of the at least one haptic detection piezoelectric device;
a data processing circuit coupled to the feedback detection circuit, the data processing circuit being configured to receive the detection signal corresponding to each of the at least one haptic detection piezoelectric device, and output a drive enable signal according to the detection signal corresponding to each of the at least one haptic detection piezoelectric device and a set threshold; and
a feedback drive circuit coupled to at least one haptic drive piezoelectric device in the haptic feedback panel and the data processing circuit, the feedback drive circuit being configured to receive the drive enable signal, and output a drive control signal to the at least one haptic drive piezoelectric device according to the drive enable signal,
wherein the feedback drive circuit comprises at least one reference voltage generation circuit, at least one drive generation circuit, and at least one signal output circuit; the at least one reference voltage generation circuit, the at least one drive generation circuit, the at least one signal output circuit, and the at least one haptic drive piezoelectric device are in one-to-one correspondence;
the reference voltage generation circuit is configured to generate a reference voltage;
the drive generation circuit is coupled to the data processing circuit, and configured to receive the drive enable signal and the reference voltage, generate an initial control signal according to the drive enable signal and the reference voltage, and output the initial control signal;
the signal output circuit is coupled to the drive generation circuit, and configured to receive the initial control signal, perform boosting on the initial control signal to generate the drive control signal, and output the drive control signal to a correspondingly coupled haptic drive piezoelectric device.

2. The drive control circuit according to claim 1, wherein the feedback detection circuit comprises at least one first feedback detection sub-circuit and at least one second feedback detection sub-circuit; the at least one haptic detection piezoelectric device, the at least one first feedback detection sub-circuit, and the at least one second feedback detection sub-circuit are in one-to-one correspondence;

the first feedback detection sub-circuit is coupled to a corresponding one of the at least one haptic detection piezoelectric device, and configured to, when the target object presses on the haptic feedback panel, amplify an initial voltage signal of the coupled haptic detection piezoelectric device, generate a target amplified voltage signal, and output the generated target amplified voltage signal;

the second feedback detection sub-circuit is coupled to a corresponding one of the at least one first feedback detection sub-circuit, and configured to receive the target amplified voltage signal, perform analog-to-digital conversion on the target amplified voltage signal to generate the detection signal, and output the generated detection signal.

3. The drive control circuit according to claim 2, wherein the first feedback detection sub-circuit comprises a first amplifier and a second amplifier;

a first input of the first amplifier is coupled to the corresponding haptic detection piezoelectric device, a second input of the first amplifier is coupled to a ground terminal, an output of the first amplifier is coupled to a first input of the second amplifier, a second input of the second amplifier is coupled to the ground terminal, and an output of the second amplifier is coupled to the data processing circuit.

4. The drive control circuit according to claim 3, wherein the first input of the first amplifier is an inverting input, the second input of the first amplifier is a non-inverting input, the first input of the second amplifier is an inverting input, and the second input of the second amplifier is a non-inverting input, or the first input of the first amplifier is a non-inverting input, the second input of the first amplifier is an inverting input, the first input of the second amplifier is a non-inverting input, and the second input of the second amplifier is an inverting input, or the first input of the first amplifier is a non-inverting input, the second input of the first amplifier is an inverting input, the first input of the second amplifier is an inverting input, and the second input of the second amplifier is a non-inverting input, or the first input of the first amplifier is an inverting input, the second input of the first amplifier is a non-inverting input, the first input of the second amplifier is a non-inverting input, and the second input of the second amplifier is an inverting input.

5. The drive control circuit according to claim 4, wherein the first feedback detection sub-circuit further comprises a first resistor and a second resistor;

a first end of the first resistor is coupled to the inverting input of the first amplifier, and a second end of the first resistor is coupled to the output of the first amplifier; and a first end of the second resistor is coupled to the inverting input of the second amplifier, and a second end of the second resistor is coupled to the output of the second amplifier.

6. The drive control circuit according to claim 3, wherein the first feedback detection sub-circuit further comprises at least one of a third resistor, a fourth resistor, a fifth resistor, or a sixth resistor;

a first end of the third resistor is coupled to the corresponding haptic detection piezoelectric device, and a second end of the third resistor is coupled to the first input of the first amplifier;

a first end of the fourth resistor is coupled to the ground terminal, and a second end of the fourth resistor is coupled to the second input of the first amplifier;

a first end of the fifth resistor is coupled to the output of the first amplifier, and a second end of the fifth resistor is coupled to the first input of the second amplifier; and a first end of the sixth resistor is coupled to the ground terminal, and a second end of the sixth resistor is coupled to the second input of the second amplifier.

7. The drive control circuit according to claim 3, wherein the second feedback detection sub-circuit comprises an analog-to-digital conversion circuit;

an input of the analog-to-digital conversion circuit is coupled to the first feedback detection sub-circuit, and an output of the analog-to-digital conversion circuit is coupled to the data processing circuit.

8. The drive control circuit according to claim 1, wherein the drive generation circuit comprises a digital-to-analog conversion circuit, a third amplifier and a first capacitor;

a signal input of the digital-to-analog conversion circuit is coupled to the data processing circuit, a reference voltage input of the digital-to-analog conversion circuit is coupled to the reference voltage generation circuit, an output of the digital-to-analog conversion circuit is coupled to a non-inverting input of the third amplifier, a comparison voltage terminal of the digital-to-analog conversion circuit is coupled to an inverting input of the third amplifier, and a reference signal terminal of the digital-to-analog conversion circuit is coupled to an output of the third amplifier;

the output of the third amplifier is coupled to the signal output circuit; and a first end of the first capacitor is coupled to the inverting input of the third amplifier, and a second end of the first capacitor is coupled to the output of the third amplifier.

9. The drive control circuit according to claim 1, wherein the signal output circuit comprises a high voltage operational amplifier; wherein a first input of the high voltage operational amplifier is coupled to the drive generation circuit, a second input of the high voltage operational amplifier is coupled to a ground terminal, and an output of the high voltage operational amplifier is coupled to the corresponding haptic drive piezoelectric device; and wherein the first input of the high voltage operational amplifier is a non-inverting input, and the second input of the high voltage operational amplifier is an inverting input; or, the first input of the high voltage operational amplifier is an inverting input, and the second input of the high voltage operational amplifier is a non-inverting input.

10. The drive control circuit according to claim 9, wherein the signal output circuit further comprises a seventh resistor;

a first end of the seventh resistor is coupled to the inverting input of the high voltage operational amplifier, and a second end of the seventh resistor is coupled to the output of the high voltage operational amplifier.

11. The drive control circuit according to claim 9, wherein the signal output circuit further comprises at least one of an eighth resistor, a ninth resistor, or a tenth resistor;

a first end of the eighth resistor is coupled to the ground terminal, and a second end of the eighth resistor is coupled to the second input of the high voltage operational amplifier;

a first end of the ninth resistor is coupled to the output of the high voltage operational amplifier, and a second end of the ninth resistor is coupled to the corresponding haptic drive piezoelectric device; and a first end of the tenth resistor is coupled to the drive generation circuit, and a second end of the tenth resistor is coupled to the first input of the high voltage operational amplifier.

12. The drive control circuit according to claim 1, wherein the data processing circuit is further configured to determine a detection comparison value according to the detection signal and a weight corresponding to each of the at least one haptic detection piezoelectric device; and output the drive enable signal when the detection comparison value is not less than the set threshold.

13. The drive control circuit according to claim 12, wherein the detection comparison value is determined by:

$$FS = a_1 * f_1 + a_2 * f_2 + a_3 * f_3 + \ldots\ldots a_{M-1} * F_{M-1} + a_M * F_M;$$

where FS represents the detection comparison value, am represents a weight corresponding to an $m^{th}$ haptic detection piezoelectric device, $f_m$ represents the detection signal corresponding to the $m^{th}$ haptic detection piezoelectric device, $1 \leq m \leq M$, M and m are both integers, and M represents a total number of haptic detection piezoelectric devices in the haptic feedback panel.

14. The drive control circuit according to claim 12, wherein the data processing circuit is further configured to acquire position coordinates where the target object presses on the haptic feedback panel; determine a press distance between the position coordinates where the target object presses on the haptic feedback panel and each of the at least one haptic detection piezoelectric device; and determine, according to the press distance of each of the at least one haptic detection piezoelectric device, the weight corresponding to each of the at least one haptic detection piezoelectric device.

15. The drive control circuit according to claim 14, wherein the drive control circuit further comprises a touch drive circuit; the touch drive circuit is coupled to a plurality of touch electrodes in the haptic feedback panel, and configured to, when the target object presses on the haptic feedback panel, acquire touch voltage signals on the touch electrodes, and determine position coordinates where the target object presses on the haptic feedback panel according to the acquired touch voltage signals; and the data processing circuit is further configured to acquire the position coordinates where the target object presses on the haptic feedback panel from the touch drive circuit.

16. The drive control circuit according to claim 15, wherein the drive control circuit further comprises a power management circuit and an interface circuit;

the power management circuit is configured to provide a supply voltage for the feedback detection circuit, the data processing circuit, and the feedback drive circuit; and the data processing circuit is coupled to the touch drive circuit through the interface circuit.

17. A haptic feedback apparatus, comprising a haptic feedback panel, and the drive control circuit according to claim 1.

18. A method for driving the drive control circuit according to claim 1, comprising:

processing an initial voltage signal of each of the at least one haptic detection piezoelectric device and outputting a detection signal corresponding to each of the at least one haptic detection piezoelectric device, when a target object presses on the haptic feedback panel;

outputting a drive enable signal, according to the detection signal corresponding to each of the at least one haptic detection piezoelectric device and a set threshold; and outputting a drive control signal to at least one haptic drive piezoelectric device, according to the drive enable signal.

* * * * *